United States Patent [19]

Eterno et al.

[11] 4,136,391

[45] Jan. 23, 1979

[54] ADAPTIVE CARGO LANDING SYSTEM

[75] Inventors: John S. Eterno, Sudbury, Mass.; Richard J. Casler, Jr., Whitehall, Pa.

[73] Assignee: The Charles Stark Draper Laboratory, Inc., Cambridge, Mass.

[21] Appl. No.: 831,505

[22] Filed: Sep. 8, 1977

[51] Int. Cl.[2] .............................................. B65G 47/00

[52] U.S. Cl. .................................... 364/478; 364/550; 214/14; 254/173 R

[58] Field of Search ............... 364/565, 424, 432, 560, 364/550, 110, 118, 478; 214/12-14, 15 R; 254/172-173

[56] References Cited

U.S. PATENT DOCUMENTS

| | | | |
|---|---|---|---|
| 3,189,195 | 6/1965 | Fox, Jr. et al. | 214/14 |
| 3,512,281 | 5/1970 | Hadjidakis | 254/173 X |
| 3,596,070 | 7/1971 | McCool, et al. | 254/173 R X |
| 3,624,783 | 11/1971 | Chang | 214/16 R |
| 4,021,019 | 5/1977 | Sanders | 214/12 X |

*Primary Examiner*—Edward J. Wise

*Attorney, Agent, or Firm*—Kenway & Jenney

[57] ABSTRACT

An adaptive cargo landing system for landing a load from a support on a first vessel or platform to a deck on a second vessel or platform, where the distance between the support and deck is a bandwidth limited random time function. A variable gain controller is arranged in a feedback loop with a load position actuator and load position sensors to be increasingly responsive to the load-deck relative position and motion as the load approaches the deck.

18 Claims, 7 Drawing Figures

ADAPTIVE CARGO LANDING SYSTEM

BACKGROUND OF THE DISCLOSURE

The present invention relates to load transfer systems and more particularly, to cargo landing systems.

The need for safe and efficient cargo transfer between ships at sea has increased in recent years. Two areas where this need has been particularly felt are offshore oil drilling and mining, and naval operations. In these areas, the difficulty in transferring cargo even in moderate sea conditions has proven to be a severe operational limitation. In these examples where a load must typically be off-loaded onto a deck which moves with respect to the load support, it is important to control the relative motion of the load to provide a minimal velocity difference impact with the deck.

Prior art techniques for rough sea off-loading of cargo onto drill ships and oil platforms have been generally unsuccessful because the conventional crane equipment was not designed to withstand the stresses introduced by the dynamic conditions, particularly introduced by violent heave motions. Newly developed pressure compensated crane equipment has been effective to accommodate such conditions to a degree, although this approach provides only open-loop corrections for the extremely complicated dynamics presented by a rough sea environment.

With conventional techniques, operator-controlled crane equipment has been successful in matching sea-induced horizontal relative motions of the landing platform and the load. However, conventional equipment has been unable to accommodate violent heave motions in rough seas. Violent heave motions pose two problems in particular for transfer operations. The first problem, dynamic loading on the structure due to vertical accelerations, has been approached in the prior art generally through the use of pressure compensated control equipment and redesign of the load bearing structural elements. The second problem is more significant and relates to the relatively large heave velocities that have to be accommodated when transferring loads between two moving ships, or between a ship and a platform. Any large uncompensated relative motion at impact can result in potentially costly cargo damage.

In the prior art, a load synchronization approach to this problem uses relative velocity information to synchronize the load motion with the relative heave motion. By introducing a velocity bias, a constant closing rate between the load and deck may be established. Typically, the load synchronization technique uses the sensed velocity difference between cargo load and receiving deck to adjust the load line velocity in order to maintain a roughly constant, small closing velocity until impact. The power required to implement a load synchronization controllers scales directly with the cargo mass and the relative velocity between the platform. When the mass or relative motion rates are large, the power requirements are correspondingly large.

The load-synchronization technique has several advantageous features: first of all, such techniques require only a relative velocity measurement which can be obtained by conventional Doppler, optical or mechanical techniques. In addition, synchronization hardware can be mechanized with relative ease. For example, simple swash-plate angle control on a variable-displacement pump may be utilized to slave the load motion with respect to the off-loading platform at any desired rate. However, the synchronization techniques also are characterized by offsetting disadvantages, including the consumption of large amounts of power in cases where the cargo is heavy, or when relative-motion disturbances command high rates. Another disadvantage is the requirement to accommodate severe structural loading.

It is an object of the present invention to provide a system for landing a cargo on a deck with minimal velocity difference at impact.

Another object is to provide an adaptive cargo landing system having a closed loop variable gain controller.

SUMMARY OF THE INVENTION

In accordance with the present invention, an adaptive cargo landing system is provided to land the cargo from a load support on a first vessel or platform to a deck on a second vessel or platform; where the distance between the load support and deck is a bandwidth limited random time function. According to the present invention, the load is landed on the deck at a relative motion peak of the deck (with respect to the load support). The present system is relatively unresponsive to the velocity of the load with respect to the deck except when the distance between the load and deck is relatively small. A variable gain controller is configured in a feedback loop with a load actuator and load position sensors so that the system is responsive to the load-deck relative motion to an increasing degree as the load approaches the deck. More particularly, the acceleration of the load is controlled to be of the form $$\ddot{L} = K_R(R)\cdot R + K_V(R)\cdot\dot{R}$$

where $\ddot{L}$ is the acceleration of the load with respect to the load attachment point (where the load velocity $\dot{L}$ is defined to be positive in the downward direction); R is the distance between the load and the deck, $\dot{R}$ is the rate of change in R, and $K_R$ and $K_V$ are functions of the distance R. The gain functions $K_R$ and $K_V$ control the responsiveness of the cargo landing system.

In addition, a velocity rate limit is utilized to control the pay-out power in the load line actuator, and to insure that the cargo does not follow the deck into a trough of a relative motion cycle. Thus, the control system of the present invention is gain adaptive, its responsiveness being a function of the distance R between the load and the landing platform. The system detects and captures relative motion peaks without knowledge or a model of the random motion of the environment and the cargo is controlled to land on relative motion peaks, where the load support-deck motion is minimized. As a result, the power required by the control is substantially reduced and the impact velocity is small. Resulting from this approach, the peak load velocity requirement of the control system is relatively small, requiring substantially less peak actuator power than the approaches of the prior art. Furthermore, the variable gain aspect of the controller permits relatively low average power consumption compared with the linear feedback systems of the prior art.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
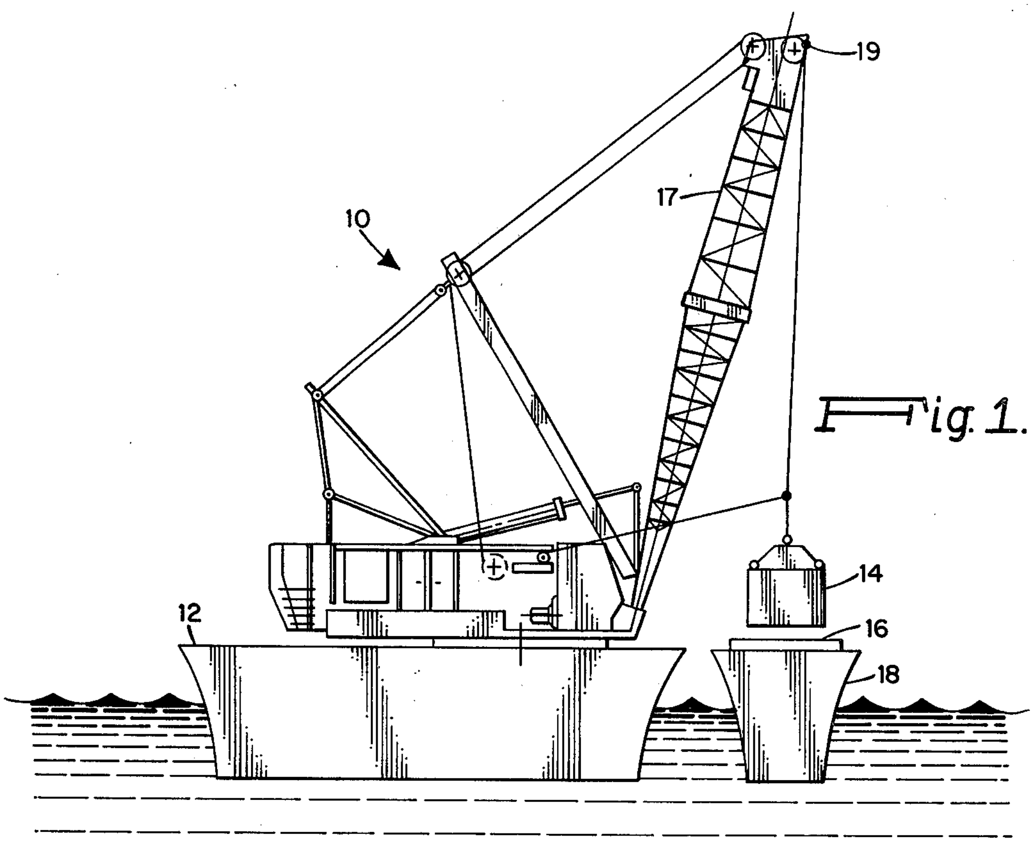
FIG. 1 shows a cargo landing system in accordance with the present invention.

FIG. 1 illustrates a mobile crane 1; mounted on a marine vessel 12 and adapted for transferring a load 14 from the vessel 12 to a landing platform or deck 16 on a second vessel 18. In this arrangement, the crane 10 is adapted to lower the load 14 from an effective load attachment point 19 to platform 16 along a path extending from the load support element 17 of the crane to the platform 16. In this embodiment, the vessels 12 and 18 are assumed to be at sea. Typically, the sea imparts a substantially periodic motion to the respective vessels, with the amplitude of the motion between point 19 and platform 16 being a bandwidth limited random time function.

Figure 2:
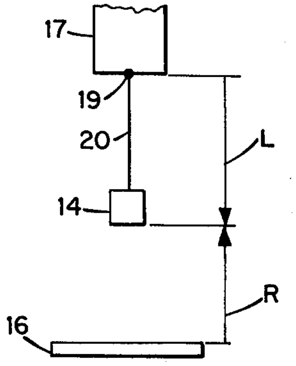
FIG. 2 shows geometrical relationships for the system of FIG. 1.

FIG. 2 schematically illustrates the load 14 which is suspended above the landing platform 16 by a load support cable or line 20 from the effective load attachment point 19. In this figure, the load is a distance L from point 19, and a distance R from the landing platform 16. Accordingly, the separation of the load attachment point 19 from platform 16 is represented by the sum of the magnitudes of the distances R and L.

Figure 3:
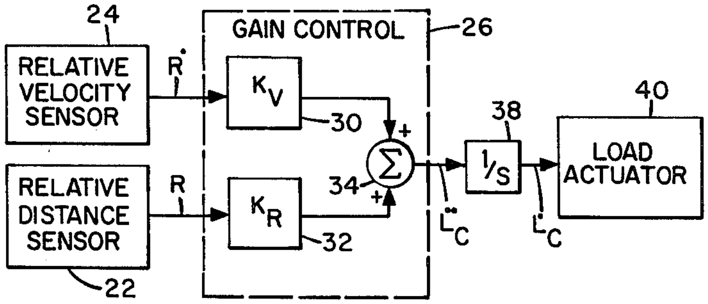
FIG. 3 shows in block diagram form a control system for the system of FIG. 1.

The present invention includes a control means for the crane 10 which is operative to control the velocity of the line 20 extending from the point 19 to the load 14. The control means is illustrated in block diagram form in FIG. 3. The system includes a relative distance sensor 22 for generating a signal R representative of the distance between the load 14 and the platform 16. The system also includes a relative velocity sensor 24 which provides a signal $\dot{R}$ representative of the rate of change of the distance R. The signals R and $\dot{R}$ are applied to a gain control 26 which includes variable gain multipliers 30 and 32 and summing network 34, and which provides an output signal representative of a commanded acceleration $\ddot{L}_c$ which in turn is applied to a load actuator 40. Actuator 40 may be for example a servo controlled system for establishing line 20 velocity from point 19 in accordance with the commanded velocity $\dot{L}_c$.

In this configuration, the load actuator 40 controls the load motion along the path between the point 19 and platform 16 in accordance with the feedback law where $$\dot{L}(t) = \int_0^t \ddot{L}(\tau)d_\tau$$

where $\tau$ is a dummy variable and $$\ddot{L} = K_R \cdot R + K_V \cdot \dot{R}$$

and wherein $K_R$ and $K_V$ are functions of $t_{GO}$ and are of the form:

$$K_R = \frac{\sum_{j=0}^{N_1} a_j t^j_{GO}}{\sum_{j=0}^{N_2} b_j t^j_{GO}} \quad \text{and} \quad K_V = \frac{\sum_{j=0}^{N_3} c_j t^j_{GO}}{\sum_{j=0}^{N_4} d_j t^j_{GO}}$$

and where $$t_{GO} = f(R, \dot{R})$$

$$\lim_{R \to 0} K_R \cdot R = 0$$

$$\lim_{R \to 0} K_V = \text{constant (greater than 0)}$$

$K_R \cdot R$ is monotonically increasing with $t_{GO}$ $K_V$ is monotonically decreasing with $t_{GO}$ $K_R \geqq 0$ for all $t_{GO}$ $K_V > 0$ for all $t_{GO}$ In this configuration, the parameter $t_{GO}$ corresponds to the time-to-go or time remaining from the present time t to an estimated impact time $t_f$, i.e. $t_f - t = t_{GO}$. Inasmuch as $K_R$ and $K_V$ are functions of $t_{GO}$, both are also functions of R and $\dot{R}$. However, in various embodiments, the functional relationship of $K_R$ and $K_V$ to either R or $\dot{R}$ may be trivial so that $K_R$ or $K_V$ may be explicit functions of $\dot{R}$ or R only.

Figure 4:
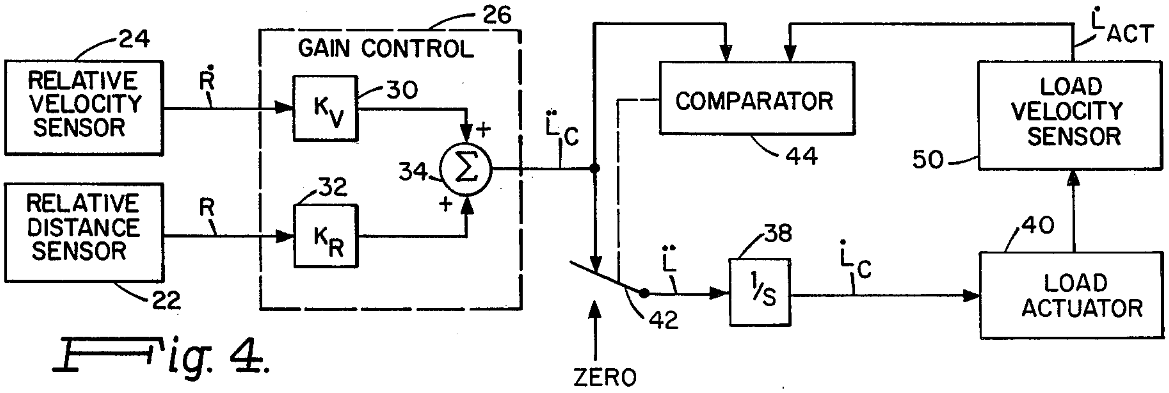
FIG. 4 shows in block diagram form an alternative control system for the system of FIG. 1.

FIG. 4 shows an embodiment wherein a downward rate limit is imposed on the system to ensure that heave-power dissipation is controlled as the load 14 descends toward the landing platform 16. In the FIG. 4 configuration, control of the peak descent rate prevents tracking the landing platform 16 into troughs of its motion cycle, thereby minimizing upward travel and velocity requirements for achieving landing at relative motion peaks. In FIG. 4, elements which correspond to similar elements in the FIG. 3 configuration are identified with the same reference designations.

In the FIG. 4 configuration, a switch 42 and associated comparator 44 are interposed between the summing network 34 and integrating network 38. With the switch 42 in the illustrated position, the input signal to integrating network 38 is the commanded acceleration signal $\ddot{L}_c$, and with the switch in its other position, the input to integrating network 38 is zero. The integrating network 38 provides a command velocity signal $\dot{L}_c$ to the load actuator 40 which in turn drives the load 14. The load actuator 40 is coupled to a load velocity sensor 50 which provides a signal $\dot{L}_{ACT}$ representative of the actual velocity of the load 14 with respect to point 19.

The signals $\ddot{L}_c$ and $\dot{L}_{ACT}$ are applied to comparator 44 which controls the switch as illustrated by the following Table, comparing $\ddot{L}_c$ to zero, and $\dot{L}_{ACT}$ to a predetermined maximum value $\dot{L}_{MAX}$.

TABLE

| Condition | | Result |
|---|---|---|
| $\dot{L}_{ACT} < \dot{L}_{MAX}$ | → | $\ddot{L} = \ddot{L}_c$ |
| $\dot{L}_{ACT} \geqq \dot{L}_{MAX}$, $\ddot{L}_c \leqq 0$ | → | $\ddot{L} = \ddot{L}_c$ |
| $\dot{L}_{ACT} \geqq \dot{L}_{MAX}$, $\ddot{L}_c > 0$ | → | $\ddot{L} = 0$ |

With this configuration, the load 14 asymptotically approaches the landing platform 16 at rate related to R during the relative peaks of the motion cycle, and approaches platform 16 at a constant velocity during trough portions of the cycle. In other embodiments, $\ddot{L}$ may equal $L_o$ when $\dot{L}_{ACT} \geqq \dot{L}_{MAX}$ and $\ddot{L}_c \leqq 0$, where $L_o$ may differ from $\dot{L}_c$ but still be less than or equal to zero.

Figure 5:
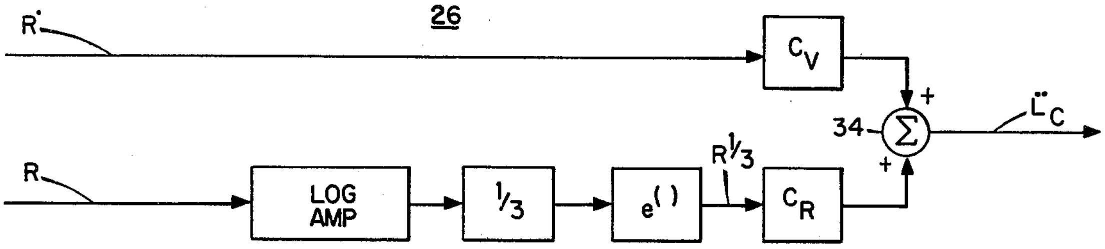
FIG. 5 shows in block diagram form an exemplary gain control for the control system of FIG. 4.
Figure 6:
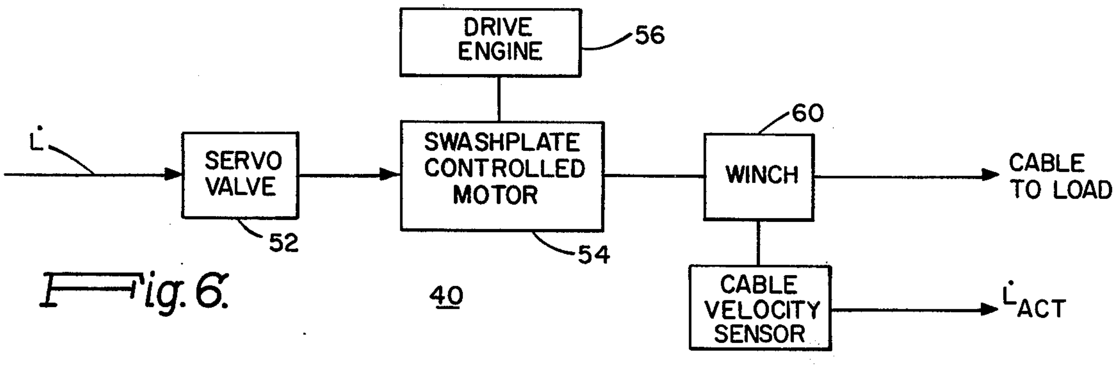
FIG. 6 shows in block diagram form an exemplary load actuator for the control system of FIG. 4.

In one exemplary embodiment suitable for a 35 long-ton load coupled to the boom tip of a 120 foot conventional crane mounted on the cargo ship 12, the function $K_R$ equals $C_R \cdot R^{-2/3}$ and $K_V$ equals $C_V$, where $C_R$ and $C_V$ are constants ($C_R = 7.5$ and $C_V = 3.0$), and $\dot{L}_{MAX}$ equals 0.5 feet per second. Gain control network 26 for this configuration is illustrated in FIG. 5 to provide the command function $\ddot{L}_c$. This network 26 is configured of conventional circuit elements. FIG. 6 illustrates the actuator 40 for this embodiment and includes a servo valve 52, swash-plate controlled motor 54 and associated drive engine 56, winch 60 and a cable velocity sensor 62. By way of example, the motor 54 is a Series No. 27,490 H.P., manufactured by Sundstrand Corporation, Rockford, Ill.; engine 56 is a type NTA-855-C, 420 H.P. (at 2300 rpm) diesel engine manufactured by Cummins Engine Company, Inc., Columbus, Ind.; the winch 60 is a class 4200 manufactured by National Supply Division of Armco Steel Corporation, Houston, Tex.; and the crane 10 is a mobile crane, manufactured by the Lima Division of Clark Equipment Company, Inc., Lima, Ohio. In addition, the sensors 24 and 50 may have the form disclosed in U.S. Pat. No. 3,189,195, and sensor 22 may be a conventional integrating network responding to the $\dot{R}$ signal produced by sensor 22.

Figure 7:
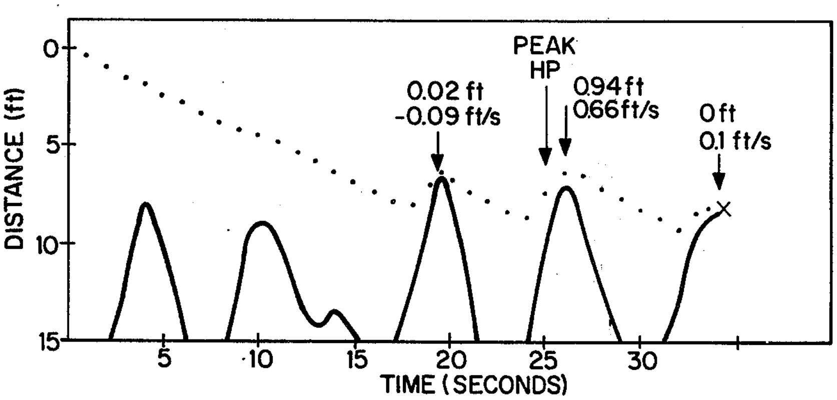
FIG. 7 illustrates the operation of a cargo landing system in accordance with FIG. 1.

FIG. 7 illustrates the operation of this exemplary configuration wherein the heavy lines are indicative of the distance L + R between platform 16 and point 19 measured from point 19, and the dotted line is indicative of the distance L between the load 14 and point 19 measured from point 19. In this illustration, the relative motion imparted by the sea is roughly periodic with maximum heave disturbance velocities of +16.14 feet/second and −7.18 feet/second. As shown, the load 14 approaches very close to the platform on the motion peaks at t=19 seconds and t=27 seconds (on the time scale) with relatively small velocity. At the relative motion peak associated with t=34 seconds, the load is effectively landed on the platform 16 at 0.1 feet per second impact velocity. Using this configuration, a peak horsepower of 293 is required which occurs at t=25 seconds as illustrated in FIG. 7. This compares the load synchronization techniques of the prior art which would require on the order of 1,000 to 1,500 horsepower. The reduction of power in the present invention is obtained because the controller reacts to the positive relative motion peak soon enough that the time it needs to land during the peak is extended. Since the load 14 is limited in its travel into the troughs of the motion cycle, the distance required to traverse in the next cycle period is relatively small and accordingly, the velocity requirement on the actuator 40 is considerably reduced. With this approach, the load 14 then glides into the relative motion peak.

In an alternative embodiment, the parameters $K_R$ and $K_V$ may be respectively expressed as $$K_R = \frac{\frac{1}{2} C_R C_V t^2_{GO} + C_R t_{GO}}{\frac{1}{3} t^4_{GO} + C_R t^3_{GO} + C_V t_{GO} + 1}$$

-continued $$K_V = \frac{\frac{1}{3} C_R C_V t^3_{GO} + C_R t^2_{GO} + C_V}{\frac{1}{3} C_R C_V t^4_{GO} + C_R t^3_{GO} + C_V t_{GO} + 1}$$

where $C_R$ and $C_V$ are positive constants and $t_{GO} = K \cdot R$, with K being constant. In one form of this latter embodiment, $C_R$ equals 100., $C_V$ equals 3.0, K equals 0.4 and $\dot{L}_{MAX}$ equals 0.5 feet per second.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. System for transferring a load along a path from a load support element to a platform element, said load being a distance L from said load support, and a distance R from said platform element, wherein the distance between said load and said platform element varies substantially periodically with amplitude peaks being a bandwidth-limited random time function, comprising:

A. means for generating a first signal representative of the distance R,

B. means for generating a second signal representative of the rate of change ($\dot{R}$) of distance R, C. load velocity control means responsive to said first and second signals to control the velocity ($\dot{L}$) of said load with respect to said load support element along said path in accordance with:

$$\dot{L}(t) = \int_0^t \ddot{L}(\tau) d_\tau$$

where $$\ddot{L} = K_R \cdot R + K_V \cdot \dot{R}$$

and $K_R$ and $K_V$ are functions of R and $\dot{R}$.

2. A system according to claim 1 wherein said control means is adapted so that $K_R$ and $K_V$ are functions of $t_{GO}$, where $t_{GO}$ is a function of R and $\dot{R}$, and where:

$$K_R = \frac{\sum_{j=0}^{N_1} a_j t^j_{GO}}{\sum_{j=0}^{N_2} b_j t^j_{GO}} \text{ and } K_V = \frac{\sum_{j=0}^{N_3} c_j t^j_{GO}}{\sum_{j=0}^{N_4} d_j t^j_{GO}}$$

and where:

$$\lim_{R \to 0} K_R \cdot R = 0$$

$$\lim_{R \to 0} K_V = C, \text{ where } C \text{ is constant and greater than zero,}$$

and where:

$K_R \cdot R$ is monotonically increasing with $t_{GO}$ $K_V$ is monotonically decreasing with $t_{GO}$ and where:

$K_R \geqq 0$ for all $t_{GO}$ $K_V > 0$ for all $t_{GO}$.

3. A system according to claim 2 wherein $$K_R = C_R \cdot R^{-\frac{2}{3}}$$

$$K_V = C_V$$

where $C_R$ and $C_V$ are positive constants.

4. A system according to claim 3 wherein $$C_R = 7.5$$
$$C_V = 3.0.$$

5. A system according to claim 2 wherein $$K_R = \frac{\frac{1}{2} C_R C_V t_{GO}^2 + C_R t_{GO}}{\frac{1}{3} t_{GO}^4 + C_R t_{GO}^3 + C_V t_{GO} + 1}$$

$$K_V = \frac{\frac{1}{3} C_R C_V t_{GO}^3 + C_R t_{GO}^2 + C_V}{\frac{1}{3} C_R C_V t_{GO}^4 + C_R t_{GO}^3 + C_V t_{GO} + 1}$$

where $C_R$ and $C_V$ are positive constants and $t_{GO} = K \cdot R$, with K being constant.

6. A system according to claim 5 wherein $$C_R = 100$$

$$C_V = 3.0$$

$$K = 0.4.$$

7. A system according to claim 1 wherein said control means is adapted so that $$\ddot{L} = K_R \cdot R + K_V \cdot \dot{R}$$

when $\dot{L}$ is less than a predetermined value, and when $\dot{L}$ is greater than or equal to said predetermined value and $K_R \cdot R + K_V \cdot \dot{R}$ is less than or equal to zero, and $$\ddot{L} = 0$$

when $\dot{L}$ is greater than or equal to said predetermined value and $K_R \cdot R + K_V \cdot \dot{R}$ is greater than or equal to zero.

8. A system according to claim 7 wherein said control means is adapted so that $K_R$ and $K_V$ are functions of $t_{GO}$, where $t_{GO}$ is a function of R and $\dot{R}$, and where:

$$K_R = \frac{\sum_{j=0}^{N_1} a_j t_{GO}^j}{\sum_{j=0}^{N_2} b_j t_{GO}^j} \text{ and } K_V = \frac{\sum_{j=0}^{N_3} c_j t_{GO}^j}{\sum_{j=0}^{N_4} d_j t_{GO}^j}$$

and where:

$$\lim_{R \to 0} K_R \cdot R = 0$$

$$\lim_{R \to 0} K_V = C, \text{ where } C \text{ is constant and greater than zero,}$$

and where:

$K_R \cdot R$ is monotonically increasing with $t_{GO}$ $K_V$ is monotonically decreasing with $t_{GO}$ and where:

$K_R \geqq 0$ for all $t_{GO}$ $K_V > 0$ for all $t_{GO}$.

9. A system according to claim 8 wherein $$K_R = C_R \cdot R^{-\frac{2}{3}}$$

$$K_V = C_V$$

where $C_R$ and $C_V$ are positive constants.

10. A system according to claim 9 wherein $$C_R = 7.5$$
$$C_V = 3.0.$$

11. A system according to claim 8 wherein $$K_R = \frac{\frac{1}{2} C_R C_V t_{GO}^2 + C_R t_{GO}}{\frac{1}{3} t_{GO}^4 + C_R t_{GO}^3 + C_V t_{GO} + 1}$$

$$K_V = \frac{\frac{1}{3} C_R C_V t_{GO}^3 + C_R t_{GO}^2 + C_V}{\frac{1}{3} C_R C_V t_{GO}^4 + C_R t_{GO}^3 + C_V t_{GO} + 1}$$

where $C_R$ and $C_V$ are positive constants and $t_{GO} = K \cdot R$, with K being constant.

12. A system according to claim 11 wherein $$C_R = 100$$
$$C_V = 3.0$$
$$K = 0.4.$$

13. A system according to claim 1 wherein said control means is adapted so that $$\ddot{L} = K_R \cdot R + K_V \cdot \dot{R}$$

for $\dot{L}$ less than a predetermined value, and where $$\ddot{L} \leqq 0$$

for $\dot{L}$ greater than or equal to said predetermined value.

14. A system according to claim 13 wherein said control means is adapted so that $K_R$ and $K_V$ are functions of $t_{GO}$, where $t_{GO}$ is a function of R and $\dot{R}$, and where:

$$K_R = \frac{\sum_{j=0}^{N_1} a_j t_{GO}^j}{\sum_{j=0}^{N_2} b_j t_{GO}^j} \text{ and } K_V = \frac{\sum_{j=0}^{N_3} c_j t_{GO}^j}{\sum_{j=0}^{N_4} d_j t_{GO}^j}$$

and where:

$$\lim_{R \to 0} K_R \cdot R = 0$$

$$\lim_{R \to 0} K_V = C, \text{ where } C \text{ is constant and greater than zero,}$$

and where:

$K_R \cdot R$ is monotonically increasing with $t_{GO}$ $K_V$ is monotonically decreasing with $t_{GO}$ and where:

$K_R \geqq 0$ for all $t_{GO}$ $K_V > 0$ for all $t_{GO}$.

15. A system according to claim 14 wherein $$K_R = C_R \cdot R^{-\frac{2}{3}}$$

$$K_V = C_V$$

where $C_R$ and $C_V$ are positive constants.

16. A system according to claim 15 wherein $$C_R = 7.5$$
$$C_V = 3.0.$$

17. A system according to claim 14 wherein $$K_R = \frac{\frac{1}{2} C_R C_V t_{GO}^2 + C_R t_{GO}}{\frac{1}{3} t_{GO}^4 + C_R t_{GO}^3 + C_V t_{GO} + 1}$$

-continued $$K_V = \frac{\frac{1}{3} C_R C_V t_{GO}^3 + C_R t_{GO}^2 + C_V}{\frac{1}{3} C_R C_V t_{GO}^4 + C_R t_{GO}^3 + C_V t_{GO} + 1}$$

where $C_R$ and $C_V$ are positive constants and $t_{GO} = K \cdot R$, with K being constant.

18. A system according to claim 17 wherein $C_R = 100$ $C_V = 3.0$ $K = 0.4.$

* * * * *